US011273917B2

(12) United States Patent
Zug

(10) Patent No.: US 11,273,917 B2
(45) Date of Patent: Mar. 15, 2022

(54) CABIN DISCHARGE AIR MANAGEMENT SYSTEM AND METHOD FOR AUXILIARY POWER UNIT

(71) Applicant: Honeywell International Inc., Morris Plains, NJ (US)

(72) Inventor: Andrew Zug, Costa Mesa, CA (US)

(73) Assignee: Honeywell International Inc., Charlotte, NC (US)

( * ) Notice: Subject to any disclaimer, the term of this patent is extended or adjusted under 35 U.S.C. 154(b) by 391 days.

(21) Appl. No.: 16/407,094

(22) Filed: May 8, 2019

(65) Prior Publication Data

US 2019/0367171 A1     Dec. 5, 2019

Related U.S. Application Data

(60) Provisional application No. 62/677,613, filed on May 29, 2018.

(51) Int. Cl.
*B64D 13/02* (2006.01)
*F04C 28/24* (2006.01)
*B64D 13/06* (2006.01)

(52) U.S. Cl.
CPC .............. *B64D 13/02* (2013.01); *F04C 28/24* (2013.01); *B64D 2013/0611* (2013.01)

(58) Field of Classification Search
CPC .. B64D 2013/0611; B64D 13/02; F04C 28/24
See application file for complete search history.

(56) References Cited

U.S. PATENT DOCUMENTS 2,284,984 A      6/1942   Nixon et al.
4,419,926 A  *  12/1983   Cronin .................. B64D 13/06
                                                              454/74

(Continued)

FOREIGN PATENT DOCUMENTS

CA         2933365 A1    6/2016
CA         2933990 A1    6/2016

(Continued)

OTHER PUBLICATIONS

Response to Extended Search Report dated Sep. 23, 2019, from counterpart European Application No. 19176321.8, filed Apr. 16, 2020, 18 pp.

(Continued)

*Primary Examiner* — Edelmira Bosques
*Assistant Examiner* — Phillip Decker
(74) *Attorney, Agent, or Firm* — Shumaker & Sieffert, P.A.

(57) ABSTRACT

A system includes a manifold, a power unit, and a throttle valve. The manifold is configured to receive cabin discharge air from a cabin. The cabin discharge air includes cabin discharge air from a waste region of the cabin. The auxiliary power unit is fluidically coupled to the manifold and configured to draw cabin discharge air from the manifold. The throttle valve is configured to control flow of cabin discharge air from the manifold to the power unit. A method includes receiving a pressure measurement for the manifold and a pressure setpoint for the manifold representing a predetermined flow of cabin discharge air from the cabin to the manifold. The method includes determining and outputting, based on the pressure measurement and the pressure setpoint, a control signal for at least one manifold inlet configured to control flow of cabin discharge air from the cabin to the manifold.

13 Claims, 3 Drawing Sheets

(56) References Cited

U.S. PATENT DOCUMENTS

| | | | |
|---|---|---|---|
| 4,642,997 A | 2/1987 | Krafka | |
| 5,253,484 A * | 10/1993 | Corman | B64D 13/00 454/76 |
| 5,461,882 A | 10/1995 | Zywiak | |
| 5,482,229 A | 1/1996 | Asshauer | |
| 5,956,960 A | 9/1999 | Niggeman | |
| 5,967,461 A | 10/1999 | Farrington | |
| 6,283,410 B1 | 9/2001 | Thompson | |
| 6,581,874 B2 | 6/2003 | Lemire et al. | |
| 6,735,951 B2 | 5/2004 | Thompson | |
| 8,480,460 B2 * | 7/2013 | Schwarz | B64D 41/00 454/76 |
| 8,868,262 B2 * | 10/2014 | Haillot | B64D 31/00 701/3 |
| 10,358,223 B2 * | 7/2019 | Dessero | B64D 11/04 |
| 2003/0126864 A1 | 7/2003 | Thompson | |
| 2013/0306790 A1 | 11/2013 | Bruno et al. | |
| 2014/0083647 A1 | 3/2014 | Army, Jr. et al. | |
| 2015/0034771 A1 | 2/2015 | Joubert et al. | |
| 2015/0089921 A1 | 4/2015 | Rideau et al. | |
| 2015/0367952 A1 | 12/2015 | Rideau et al. | |
| 2016/0009409 A1 | 1/2016 | Rideau | |
| 2016/0083100 A1 | 3/2016 | Bammann et al. | |
| 2016/0214725 A1 | 7/2016 | Holtrup et al. | |
| 2016/0231031 A1 | 8/2016 | Bruno | |
| 2016/0281608 A1 | 9/2016 | Haillot | |
| 2016/0311541 A1 | 10/2016 | Morishita et al. | |
| 2016/0356280 A1 | 12/2016 | Pascu et al. | |
| 2016/0376022 A1 | 12/2016 | Ullyott et al. | |
| 2017/0036768 A1 | 2/2017 | Stieger et al. | |
| 2017/0037774 A1 | 2/2017 | Jones et al. | |
| 2017/0037775 A1 | 2/2017 | Jones et al. | |
| 2017/0037776 A1 | 2/2017 | Jones et al. | |
| 2017/0081031 A1 | 3/2017 | Bammann et al. | |
| 2017/0129614 A1 | 5/2017 | Bammann et al. | |
| 2018/0134396 A1 | 5/2018 | Blumer et al. | |
| 2019/0283884 A1 | 9/2019 | Horner et al. | |
| 2019/0287321 A1 | 9/2019 | Horner et al. | |

FOREIGN PATENT DOCUMENTS

| | | | |
|---|---|---|---|
| EP | 1222110 B1 | 1/2003 | |
| GB | 479826 A * | 2/1938 | B64D 13/04 |
| WO | 99/12810 A1 | 3/1999 | |
| WO | 2011/056285 A1 | 5/2011 | |
| WO | 2012/076373 A2 | 6/2012 | |
| WO | 2014118455 A1 | 8/2014 | |

OTHER PUBLICATIONS

Response to Examination Report dated Mar. 11, 2021, from counterpart European Application No. 19176321.8, filed Jul. 9, 2021, 17 pp.

Extended Search Report from counterpart European Application No. 19176321.8, dated Sep. 9, 2019, 8 pp.

Examination Report from counterpart European Application No. 19176321.8, dated Mar. 11, 2021, 4 pp.

* cited by examiner

— continued —

CABIN DISCHARGE AIR MANAGEMENT SYSTEM AND METHOD FOR AUXILIARY POWER UNIT

RELATED APPLICATION DATA

This application claims priority to U.S. Provisional application No. 62/677,613, entitled "CABIN DISCHARGE AIR MANAGEMENT SYSTEM FOR AUXILIARY POWER UNIT," filed on May 29, 2018, which is incorporated herein by reference in its entirety.

TECHNICAL FIELD

The present disclosure relates to systems and techniques for supplying cabin discharge air to power units.

BACKGROUND

An auxiliary power unit (APU) of an aircraft may provide power to non-propulsive components of the aircraft, such as electric, pneumatic, and/or hydraulic power. The power capability of the APU may be related to an amount and/or quality of pressurized air supplied to the APU. To maintain a given power load supplied by the APU, the supply air to the APU (also referred to as the "APU core flow demand") may be maintained above a particular pressure and/or a particular flow rate.

In aircraft, one source of pressurized air for the APU is the cabin. To maintain personal comfort, pressurized air may be supplied to the cabin at a particular rate and discharged from the cabin. Rather than ejecting the cabin air to the atmosphere, air discharged from the cabin may be fed to the APU. When the APU core flow demand is below the supply of cabin discharge air, the cabin discharge air may supply all the air for the APU core flow demand. However, if the APU core flow demand exceeds the available supply of cabin discharge air, the APU inlet pressure may lower and the APU core flow demand may decrease, resulting in reduced power capability of the APU. Alternatively, the supply of cabin discharge air may be supplemented with other air, which may increase the APU turbine inlet temperature, causing a corresponding decrease in fuel efficiency and APU life. For large enough shortfalls in supply of cabin discharge air relative to APU core flow demand, the pressure at the APU inlet will be lower than ambient, allowing outside air to flow in through a check valve to the atmosphere and eliminating a pressure benefit to the APU of the elevated cabin pressure.

SUMMARY

In some examples, the disclosure describes a system that includes a manifold, a power unit, and a throttle valve. The manifold is configured to receive cabin discharge air from an aircraft cabin. The cabin discharge air includes cabin discharge air from a waste region of the cabin. The auxiliary power unit is fluidically coupled to the manifold and configured to draw cabin discharge air from the manifold. The throttle valve is configured to control flow of cabin discharge air from the manifold to the power unit.

In other examples, the disclosure describes a method that includes receiving, by a controller, a pressure measurement for a manifold, wherein the manifold is configured to receive cabin discharge air from an aircraft cabin, and wherein the cabin discharge air includes cabin discharge air from a waste region of the cabin. The method further includes receiving, by the controller, a pressure setpoint for the manifold representing a predetermined flow of cabin discharge air from the cabin to the manifold, wherein the manifold is fluidically coupled to a power unit configured to draw cabin discharge air from the manifold. The method further includes determining, by the controller and based on the pressure measurement and the pressure setpoint, a control signal for at least one manifold inlet, wherein the at least one manifold inlet is configured to control flow of cabin discharge air from the cabin to the manifold. The method further includes outputting, by the controller, the control signal to the at least one manifold inlet.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1:
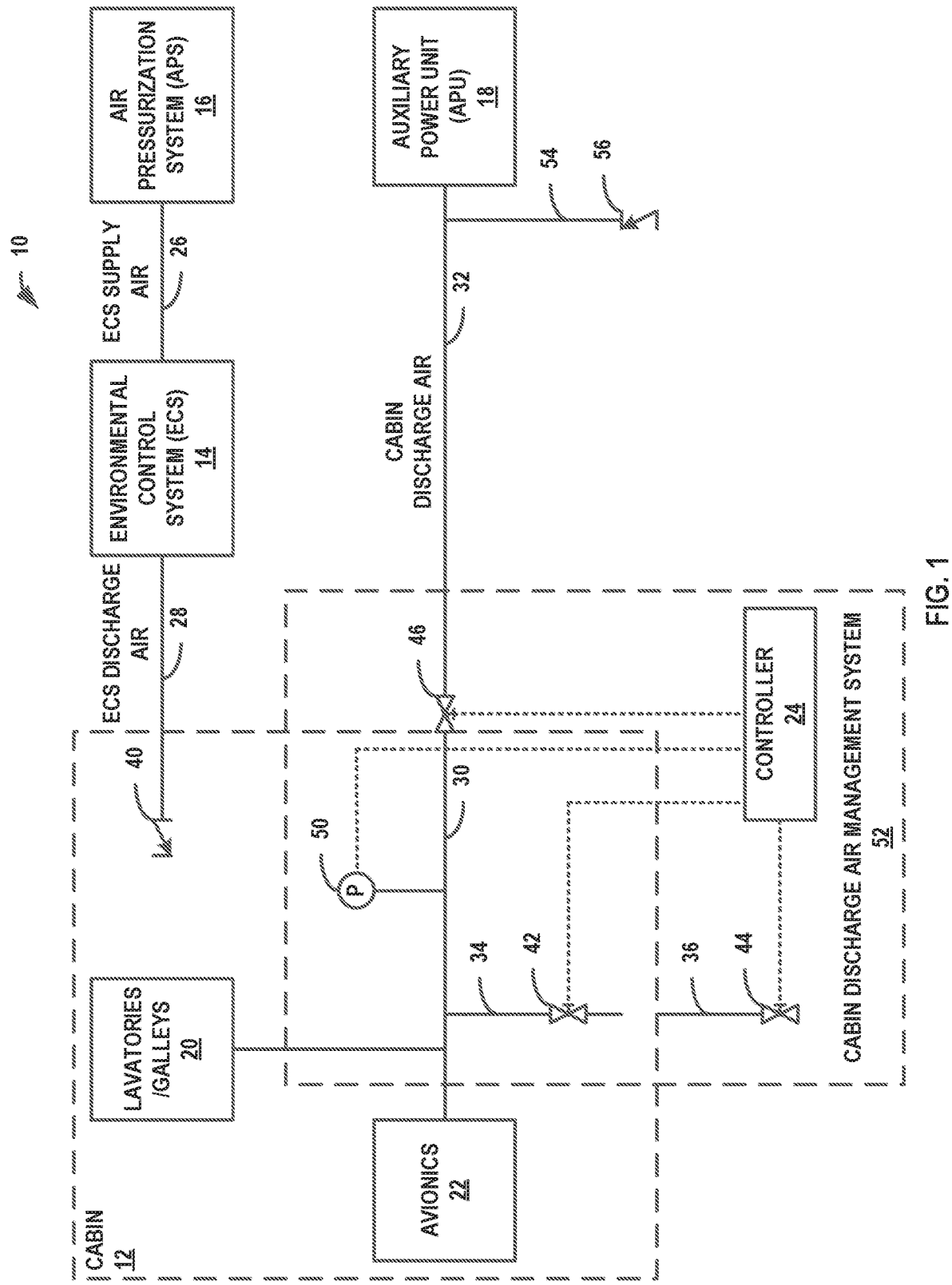
FIG. 1 is a diagram illustrating an example system for supplying cabin discharge air to an auxiliary power unit (APU).

In a typical commercial transport aircraft, a significant fraction of conditioned air supplied to a cabin of the aircraft may be intentionally discharged overboard from the avionics ventilation system ("avionics"), lavatories, and galleys of the cabin to minimize heat or odor intrusion into occupied areas of the cabin. This intentional discharge may be independent of discharge from a cabin pressure control system. When the aircraft is on the ground, a typical means of extracting air from the cabin may involve drawing air from the avionics, lavatories, and galleys using electric fans and either discharging the air directly overboard, such as through an overboard port, or ducting the air to a vicinity of an outflow valve of the cabin so that the heat and odor may be entrained in the air leaving the cabin through the outflow valve. During flight, the electric fans for the lavatory and galley extraction air may be turned off and a parallel flow path may be opened that directs the extraction air to a small overboard port and uses the cabin-to-ambient pressure differential to extract air without running the fans.

However, in aircraft systems that utilize cabin discharge air as APU supply air, unless these overboard flows are properly managed, the quantity of air available for the APU will be significantly reduced, limiting the power capability of the APU and the feasible range of cabin discharge air operation. For example, in a narrow body commercial transport aircraft, the ventilation of the avionics may use between 15 and 40 lbs/min of extract flow, while the lavatories and galleys may use a similar flow. In comparison, an APU with a reasonable power load, such as 80 to 150 kW, may use at least 100 lb/min of air. As such, a significant amount of air supplied to the cabin may not be used for supplying the APU.

According to principles of the disclosure, a cabin discharge air management system may supply an auxiliary power unit (APU) with cabin discharge air that includes waste air to increase the flow available to the APU and, correspondingly, increase the power capability of the APU. The cabin discharge air management system includes a manifold to receive cabin discharge air from various parts of an aircraft cabin. The cabin discharge air includes waste discharge air from various waste regions of the cabin, such as lavatories, galleys, avionics compartments, and other areas of the cabin for which air is immediately removed due to odors, smoke, heat, or other contaminants. Any additional cabin discharge air for supplying the APU may be provided through non-waste regions of the cabin. The APU draws the cabin discharge air from the manifold, thereby reducing or eliminating the use of electric fans during ordinary operation of the APU. An APU throttle valve controls flow of the cabin discharge air from the manifold to the APU.

By using waste air to supply pressurized cabin discharge air to the APU, the systems described herein may more efficiently utilize pressurized air supplied to the cabin. For example, by utilizing more cabin discharge air, less air may be supplied to the APU from other sources, such as bleed air from engine turbines. As another example, the APU may provide the power to draw air from the manifold, reducing the operation of electric fans to draw air during grounding of the aircraft. As yet another example, the configuration of the cabin discharge air management system may reduce equipment redundancy while maintaining back-up operation, such as through the use of alternate discharge routes for waste air.

FIG. 1 is a diagram illustrating an example system 10 for supplying cabin discharge air to an auxiliary power unit (APU). System 10 includes a cabin 12, an environmental control system (ECS) 14, an air pressurization system (APS) 16, an auxiliary power unit (APU) 18, and a cabin discharge air management system 52. While system 10 will be described with reference to an aircraft system, the systems and techniques discussed herein may be used for a variety of ventilation systems. For example, cabin 12 may be replaced with any pressurized cabin and APU 18 may be replaced with any power unit that receives pressurized air from the pressurized cabin. As such, systems described herein may be used with submarine ventilation systems, personnel carrier ventilation systems, bus ventilation systems, or any other ventilation system that may supply pressurized air to a power unit.

Cabin 12 is a compartment of an aircraft that includes an internal environment. For example, cabin 12 may be configured to house people, cargo, and the like, in the internal environment. Cabin 12 may be fluidically coupled to ECS 14 through ECS discharge line 28. To maintain adequate conditions within the internal environment of cabin 12, such as for personal comfort or required by law, ECS 14 may be configured to control ambient conditions of cabin 12. For example, ECS 14 may be configured to control a pressure, temperature, humidity, air flow rate, or other ambient conditions of cabin 12 at aircraft conditions, such as ground operation, passenger loading, take-off, cruising, descent, and landing. ECS 14 may be configured to generate ECS discharge air from ECS supply air according to one or more setpoints for ambient conditions of cabin 12. For example, ECS 14 may generate ECS discharge air to maintain a target range of pressures, temperatures, and/or humidity of cabin 12. A variety of environmental control systems may be used in ECS 14 including, but not limited to, a vapor cycle cooling system and an air cycle cooling system. ECS 14 may be fluidically coupled to APS 16 through ECS supply line 26 and configured to receive ECS supply air from APS 16 through ECS supply line 26. ECS 14 may be configured to output ECS discharge air to cabin 12 through ECS discharge line 28 and ECS discharge check valve 40.

In some examples, system 10 includes an outflow valve 44 configured to maintain a pressure of cabin 12 by controlling flow of cabin discharge air from cabin 12 to an environment. For example, ECS 14 may supply pressurized ECS discharge air to cabin 12, while outflow valve 44 may relieve pressure from cabin 12, such as by discharging air from cabin pressure discharge line 36 through outflow valve 44. In some examples, as will be described further below, outflow valve 44 may be communicatively coupled to controller 24, such that outflow valve 44 may receive control signals from controller 24.

Air pressurization system (APS) 16 is configured to supply pressurized air to ECS 14. For example, when an aircraft is grounded, an air pressure outside the aircraft may be similar to or the same as air pressure within cabin 12. However, once the air is at higher elevations, the air pressure outside the aircraft may be significantly lower than an air pressure required for cabin 12, such that APS 16 may supply ECS 14 with pressurized air for use in cabin 12. APS 16 may include a variety of systems such as a bleed air source (e.g., a turbine), a load compressor of APU 18, a cabin air compressor, and the like. In some examples, APS 16 may be configured to receive environmental air, such as ram air flow (during flight) or forced air flow (during grounding), generate ECS supply air from the environmental air, and output the ECS supply air to ECS 14.

APU 18 provides power to non-propulsive components of the aircraft, such as electric, pneumatic, and/or hydraulic power. APU 18 is configured to receive cabin discharge air from cabin 12 through APU throttle valve 46 and APU supply line 32 to support combustion of fuel in APU 18. For example, the cabin discharge air may be at an elevated pressure compared to air outside the aircraft, such that a compressor of APU 18 may not use as much energy to compress the cabin discharge air to an adequate pressure. APU supply line 32 may also include an overboard inlet 54 coupled to a check valve 56 and configured to allow air flow to APU 18, such as in emergency conditions in which cabin discharge air is not available.

Cabin 12 may include one or more areas or regions that produce waste air, such as lavatories/galleys 20 and avionics 22. Waste air may include any air that may be contaminated with odors, heat, and/or smoke. Waste air may not be suitable for recirculation and may be immediately (e.g., within less than a minute of residence time) discharged from the cabin. For example, lavatories/galleys 20 may produce air containing odors, while avionics 22 may produce air containing heat. Rather than discharge this waste air to an outside environment, system 10 is configured with cabin discharge air management system 52 configured to collect the waste air for use as APU supply air. Cabin discharge air management system 52 includes a manifold 30, an APU throttle valve 46, and a controller 24. Cabin discharge air management system 52 may include additional optional components, as illustrated in FIG. 1 and further described below.

Manifold 30 is configured to receive cabin discharge air from various parts of cabin 12. The cabin discharge air received by manifold 30 includes cabin discharge air from one or more waste regions of cabin 12, such as lavatories/galleys 20 and avionics 22. A waste region may include any region of cabin 12 that produces waste air. While lavatories/galleys 20 and avionics 22 are shown in FIG. 1, other waste regions may include a temporary section of cabin 12 that may have waste air. In some examples, a waste region of cabin 12 comprises at least one of a lavatory, a galley, and an avionics ventilation system. Each waste region may include one or more outlets to manifold 30 that may be designed for a specific flow or range of flow rates to manifold 30. In some examples, the one or more outlets may includes valves or other flow control devices to control a flow of cabin discharge air from each of the waste regions.

In addition to receiving cabin discharge air from waste regions, manifold 30 includes at least one cabin inlet configured to receive cabin discharge air from a non-waste region of cabin 12. For example, as will be further explained below, during certain operating conditions APU 18 may require a greater amount of cabin discharge air than the waste regions can provide. In such instances, one or more cabin inlets from non-waste regions may supply supplemental cabin discharge air to APU 18 through manifold 30. In the example of FIG. 1, the at least one cabin inlet is illustrated as cabin inlet valve 42 coupled to manifold 30 through cabin inlet valve line 34; however, in other examples, the at least one cabin inlet valve may include a fixed resistance device such as an orifice to simplify controls and/or reduce cost and weight.

APU 18 is fluidically coupled to manifold 30 through APU throttle valve 46 and APU supply line 32 and configured to draw cabin discharge air from manifold 30. As mentioned above, conventional cabin air discharge systems operating in a grounded condition may operate one or more electric fans to remove cabin discharge air from an aircraft cabin. This removal may require a significant amount of electricity. Rather than power electric fans, system 10 may utilize suction from APU 18 to remove cabin discharge air from cabin 12, including avionics 22 and/or lavatories/galleys 20. This may save power and limit wear and tear on the fans. For example, APU 18 may have a core flow demand such that during normal operation, APU 18 may have a capacity to extract air from lavatories/galleys 20 and avionics 22 to reduce or eliminate operation of electric fans while APU 18 is running.

In some examples, cabin discharge air management system 52 may include pressure monitoring components, such as pressure instrumentation 50. Pressure instrumentation 50 may be fluidically coupled to manifold 30 and configured to detect a pressure of manifold 30. Pressure instrumentation 50 may also be communicatively coupled to controller 24 and configured to send pressure signals to controller 24. For example, flow of cabin discharge air from cabin 12, including avionics 22 and lavatories/galleys 20, may be related to a pressure of manifold 30, such that by controlling a pressure, the flow of cabin discharge air from cabin 12 may be maintained at an adequate level.

In addition to pressure instrumentation 50, system 10 may include other instrumentation related to flow of cabin discharge air from cabin 12. For example, system 10 may include various flow meters or temperature gauges configured to detect various flow and temperature conditions of various supply and discharge lines of system 10.

Controller 24 may be configured to monitor and/or operate one or more process control components of system 10. Controller 24 may be communicatively coupled to any of APU throttle valve 46, cabin inlet valve 42, and outflow valve 44, and configured to send control signals to any of APU throttle valve 46, cabin inlet valve 42, and outflow valve 44. Controller 24 may also be communicatively coupled to instrumentation such as pressure instrumentation 50 and configured to receive measurement signals from the instrumentation. Controller 24 may include any of a wide range of devices, including processors (e.g., one or more microprocessors, one or more application specific integrated circuits (ASICs), one or more field programmable gate arrays (FPGAs), or the like), servers, desktop computers, notebook (i.e., laptop) computers, tablet computers, and the like.

Controller 24 may be configured to control a flow of cabin discharge air from manifold 30 to APU 18 using APU throttle valve 46. For example, controller 24 may receive an APU supply setpoint for a flow rate for cabin discharge air, such as from an APU controller, and control APU throttle valve 46 within a range of the setpoint. The APU supply setpoint may vary depending on desired power from APU 14, external pressure, or other condition. In some examples, controller 24 may be configured to control a pressure of cabin 12. For example, controller 24 may receive a setpoint for a pressure of cabin 12, such as from ECS 14, and control outflow valve 44 to maintain the pressure of cabin 12 within a range of the setpoint.

In some examples, controller 24 may be configured to control a pressure of manifold 30. For example, controller 24 may receive pressure measurements from pressure instrumentation 50 that represent a pressure of manifold 30. Controller 24 may receive a pressure setpoint, such as from memory, that represents a desired flow rate of cabin discharge air from cabin 12. Controller 24 may compare the pressure setpoint to the pressure measurement and control cabin inlet valve 42 to increase or decrease the flow of air into manifold 30 based on a difference between the pressure setpoint and pressure measurement, thereby raising or lowering the pressure within manifold 30 to reduce the difference. In some examples, the pressure setpoint may be a negative pressure relative to a pressure of cabin 12, such as −0.5 psid. By maintaining a negative pressure relative to cabin 12, cabin discharge air may be constantly extracted from lavatories/galleys 20 and avionics 22 to maintain a predetermined or design air extraction flow rate. In some examples, the pressure setpoint may be adjusted, such as manually by crew or automatically by controller 24, to handle situations that might require more cabin extraction flow, such as odor control of a malfunctioning lavatory or burnt food in the galley. For example, in situations in which extraction from lavatories/galleys 20 and/or avionics 22 may be high, controller 24 may fully shut cabin inlet valve 42 such that APU 18 may draw all cabin discharge air from lavatories/galleys 20 and/or avionics 22.

In some examples, controller 24 may be configured to remove waste air from waste regions during conditions in which APU 18 is not drawing cabin discharge air. For example, in the event that APU 18 fails or is taken offline, controller 24 may shut APU throttle valve 46, operate an electric fan (not shown) coupled to inlet valve line 34, and discharge waste air in a vicinity of outflow valve 44. Controller 24 may operate outflow valve 44 to maintain a pressure of cabin 12, while removing waste air discharged to the vicinity of outflow valve 44. For example, outflow valve 44 may continue to discharge cabin air to maintain pressure in cabin 12. This discharged cabin air may entrain the waste air discharged in the vicinity of outflow valve 44, removing the waste air before it can significantly diffuse or otherwise propagate through cabin 12. Inlet valve line 34 may be in the vicinity of outflow valve 44 if a significant (i.e. greater than 90%) of waste air from inlet valve line 34 is entrained by air flowing to outflow valve 44 during normal operating conditions. As an example of inlet valve line 34 being in the vicinity of outflow valve 44, inlet valve line 34 may be less than five feet from cabin pressure discharge line 36 coupled to outflow valve 44.

System 10 of FIG. 1 may operate to supply adequate pressurized cabin discharge air to APU 18, such that APU 18 may operate more efficiently. However, in some instances, a redundant system that maintains a higher level of efficiency may be desired. For example, larger aircraft may include cabins that require complex air management systems that remove cabin discharge air from various portions of cabin 12.

Figure 2:
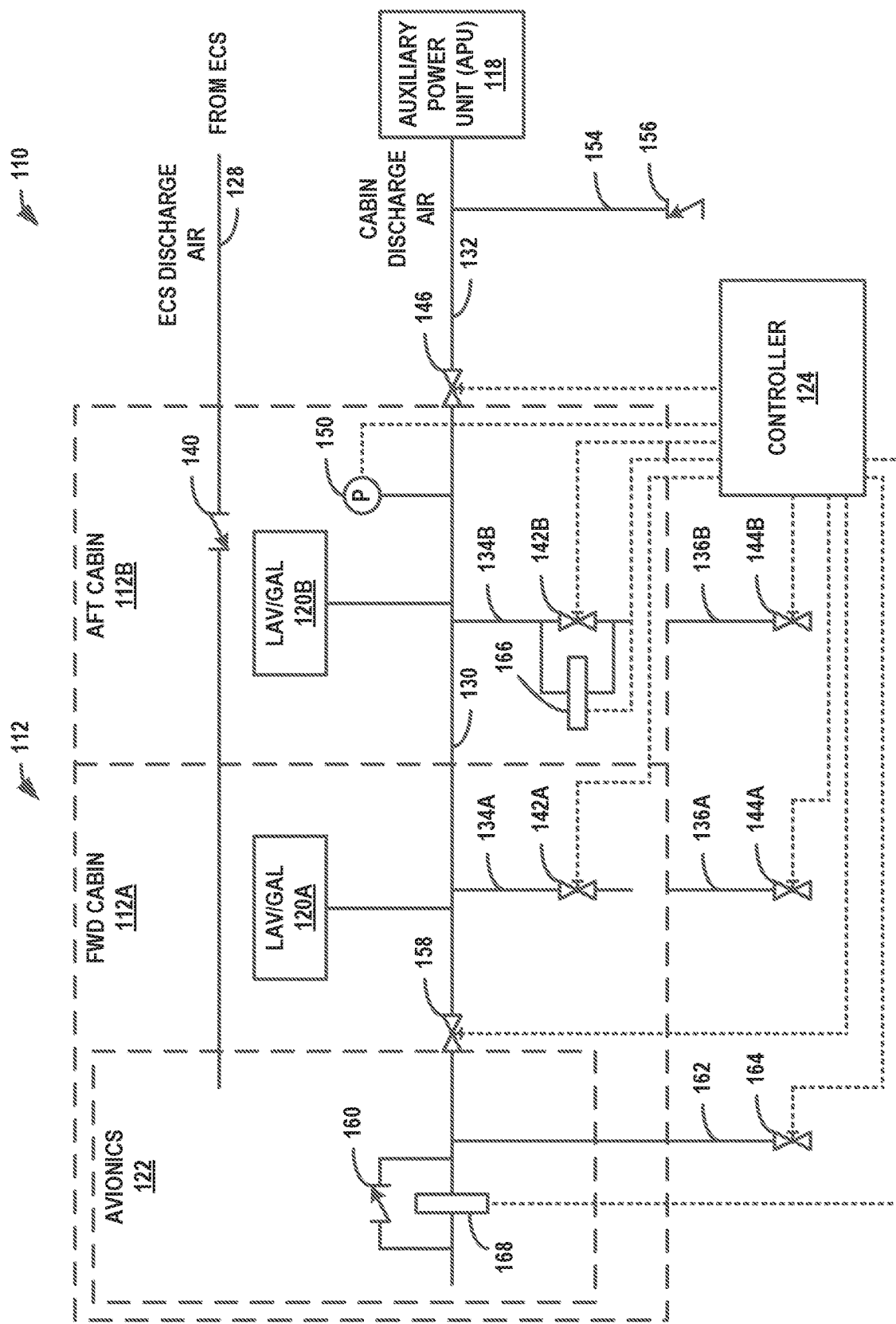
FIG. 2 is a diagram illustrating an example system for supplying cabin discharge air from a multi-sectional cabin to an auxiliary power unit (APU).

FIG. 2 is a diagram illustrating an example system 110 for supplying cabin discharge air from a multi-sectional cabin to an auxiliary power unit (APU). In addition to functions discussed in system 10 of FIG. 1, system 110 of FIG. 2 may provide additional or alternative functions, such as added redundant functionality and fore/aft balancing, as may be described below. FIG. 2 includes a cabin 112, an environmental control system (not shown), an air pressurization system (not shown), and an auxiliary power unit (APU) 118. The environmental control system, the air pressurization system, and APU 118 of FIG. 2 may be operably similar to ECS 14, APS 16, and APU 18, respectively, of FIG. 1. ECS discharge air supply line 128 may provide ECS discharge air to cabin 112 through check valve 140. APU 118 is configured to receive cabin discharge air from cabin 112 through APU throttle valve 146 and APU supply line 132 to support combustion of fuel in APU 118. APU supply line 132 may also include an overboard inlet 154 coupled to a check valve 156 and configured to allow air flow to APU 118.

Cabin 112 may include a forward cabin ("fore cabin") 112A at a front of cabin 112 and an aft cabin 112B at a back of cabin 112. While only two sections are shown, cabin 112 may a greater or fewer number of sections. Fore cabin 112A includes avionics 122 and lavatory/galley ("lav/gal") 120A, while aft cabin 112B includes lav/gal 120B. Avionics 122 also includes an avionics isolation valve 158, such that avionics 122 may be isolated from lav/gal 120A and 120B. For example, avionics 122 may have specific operating requirements that may be constantly maintained due to sensitivity of equipment. In addition to avionics isolation valve 158, avionics 122 may include an avionics outflow line 162, an avionics inflow check valve 160, and an avionics fan 168. Fore cabin 112A also includes a fwd cabin inlet valve 142A configured to receive cabin discharge air from fore cabin 112A and a fore outflow valve 144A configured to discharge cabin discharge air from fore cabin 112A via a fore outflow line 136A to an atmosphere. Aft cabin 112B includes an aft cabin inlet valve 142B configured to receive cabin discharge air from aft cabin 112B and an aft outflow valve 144B configured to discharge cabin discharge air from aft cabin 112B via an aft outflow line 136B to an atmosphere. While not shown, each section of cabin 112 may include temperature instrumentation corresponding to a temperature control zone of cabin 112.

A manifold 130 is fluidically coupled to each of avionics 122, lav/gal 120A, and lav/gal 120B. Manifold 130 is configured to receive cabin discharge air from at least one of avionics 122, lav/gal 120A, and lav/gal 120B, and supply the cabin discharge air to APU 118 through APU throttle valve 146. The inlets to manifold 130 may be distributed across cabin 112 according to the extraction requirements, with each inlet designed to provide a restriction resulting in the design flow when provided with normal manifold pressure, such as −0.5 psid. In other examples, the inlets may include valves configured to control a flow rate or relative flow rate.

In some examples, at least one of fore cabin inlet valve 142A and aft cabin inlet valve 142B includes a fan in parallel. In the example of FIG. 2, aft cabin inlet line 134B includes fan 166; however, in other examples, fore cabin inlet line 134A may include a fan. Fan 166 may be configured to draw cabin discharge air from manifold 130. For example, fan 166 may be oriented such that, when aft cabin inlet valve 142B is shut, fan 166 may direct cabin discharge air from manifold 130 to cabin 112 near aft outflow valve 144B. As such, cabin discharge air from a variety of portions of cabin 112 may be directed through cabin inlet line for discharge through aft outflow line 136B and aft outflow valve 144B. Further operation of fan 166 may be described with respect to controller 124 below. A variety of fans may be used for cabin fan 166 and avionics fan 168 including, but not limited to, electric fans.

Controller 124 may be configured to monitor and/or operate one or more process control components of system 110. Controller 124 may be communicatively coupled to any of APU throttle valve 146, fore and aft cabin inlet valves 142A and 142B, fore and aft outflow valves 144A and 144B, avionics outflow valve 164, avionics isolation valve 158, and fans 166 and 168, and configured to send control signals to any of APU throttle valve 146, fore and aft cabin inlet valves 142A and 142B, fore and aft outflow valves 144A and 144B, avionics outflow valve 164, avionics isolation valve 158, and fans 166 and 168. Controller 124 may also be communicatively coupled to instrumentation such as pressure instrumentation 150 and configured to receive measurement signals from the instrumentation. Controller 124 may be configured to control any of a flow of cabin discharge air from manifold 130 to APU 118 using APU throttle valve 146, a pressure of cabin 112, and/or a pressure of manifold 130, as discussed in FIG. 1.

In some examples, controller 124 may be configured to balance fore/aft extraction of cabin discharge air from fore cabin 112A and aft cabin 112B to achieve various desired air management functions, such as prevention of longitudinal flows for odor migration prevention. For example, each of fore cabin 112A and aft cabin 112B may include two outlets for cabin discharge air—an outflow valve 144 and a cabin inlet valve 142. In the event of failure of one of fore and aft outflow valves 144A and 144B, the corresponding cabin inlet valve 142 may compensate to maintain forward/aft balance of cabin extraction. In some examples, controller 124 may be configured to receive a front pressure measurement corresponding to a flow of air from the fore cabin 112A and a back pressure measurement corresponding to a flow of air from aft cabin 112B. Controller 124 may operate any of fore outflow valve 144A, aft outflow valve 144B, fore cabin inlet valve 142A, or aft cabin inlet valve 142B to maintain the flow of air from fore cabin 112A and the flow of air from aft cabin 112B at a predetermined relationship. For example, the predetermined relationship may be a ratio of pressures, a ratio of flows, a difference of pressures or range of pressures, a difference of flow or range of flows, and the like.

In some examples, controller 124 may be configured to maintain extraction of cabin discharge air from avionics 122, lav/gal 120A, and lav/gal 120B in the event of failure of a component. For example, in systems that do not use an APU to draw cabin discharge air from a cabin, redundant fans may be needed to maintain extraction in the event that either fan fails, such as with fans in each cabin or for each outflow valve. For the lay/gal 120A and 120B, this redundancy reduces passenger discomfort from a loss of odor control in the event of failure of a fan. For avionics 122, this redundancy may maintain acceptable equipment temperature for flight-critical equipment and may utilize another redundant source of air extraction. Due to use of APU 118 as a source of extraction, system 110 may achieve redundancy while using a reduced number of redundant components such as fans, which may reduce a weight of the aircraft.

During normal (i.e. non-failure) operation, controller 124 may control APU throttle valve 146 and (optionally) cabin inlet valves 142 to supply APU 118 with cabin discharge air from manifold 130 without using fan 166 or fan 168.

In the event of an APU failure, controller 124 may close avionics isolation valve 158 to separate extraction systems for avionics 122 and lay/gal 120A and 120B. Controller 124 may operate fan 166 to extract cabin discharge air from lay/gal 120A and 120B and discharge the cabin discharge air in a respective vicinity of outflow valves 144A and 144B to be entrained in flow leaving the aircraft. In some instances, cabin inlet valves 142A and 142B may be closed to ensure all cabin discharge air is pulled from lay/gal 120A and 120B. Additionally or alternatively, controller 124 may operate fan 168 to extract cabin discharge air from avionics 122 to avionics outflow valve 164. In some examples, avionics outflow valve 164 may be a dual-flapper avionics overboard valve that includes a large flapper configured to open when cabin 112 is not pressurized (e.g., for ground operation) and a smaller flapper configured to open when cabin 112 is pressurized (e.g., for in-flight operation, to prevent a failure resulting in decompression of the aircraft). If APU 118 fails on the ground or at low altitude where gauge pressure of cabin 112 is low, controller 124 may operate fan 168 to extract cabin discharge air from avionics 122 and discharge the cabin discharge air out the large flapper of avionics outflow valve 164. During flight when sufficient pressure of cabin 112 exists, controller 124 may turn off fan 168 and cabin discharge air may exit the small flapper of avionics outflow valve 164 using cabin pressure differential. In some examples, controller 124 may measure and modulate the extraction flow of the small flapper of avionics outflow valve 164.

If the backup avionics fan 168 fails in addition to APU 118, controller 124 may still controller system 110 to extract cabin discharge air from avionics 122 by opening valve avionics isolation valve 158 and operating fan 166 to draw cabin discharge air from both lav/gal 120A and 120B and avionics 122.

In the event the APU air supply is too high to maintain a pressure of manifold 130 within nominal limits, controller 124 may control APU throttle valve 146 to reduce the flow of cabin discharge air to APU 118 so that the manifold pressure stays within nominal limits. Alternatively, controller 124 may control another valve, such as a valve that receives pressurized air from the environmental control system, the air pressurization system, or another pressurized air source, to supplement the cabin discharge air from manifold 130.

Figure 3:
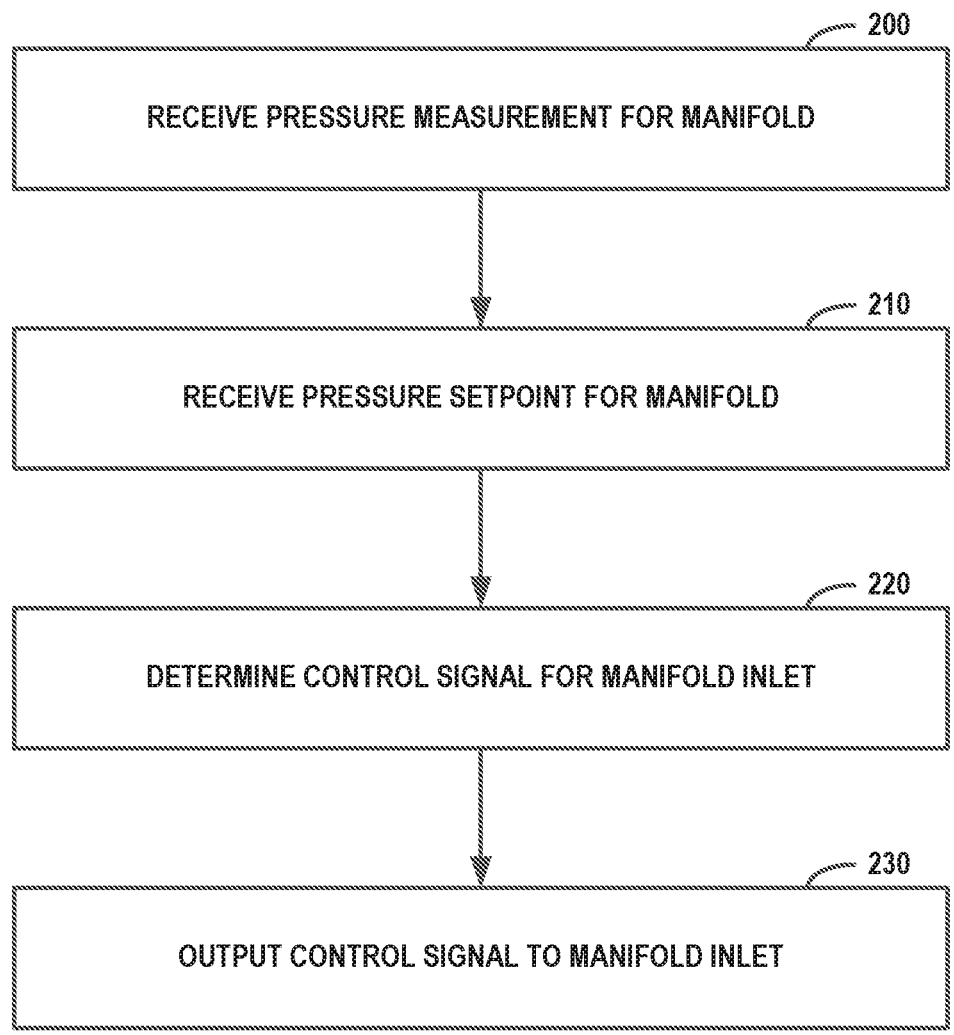
FIG. 3 is a flowchart of an example technique for supplying cabin discharge air to an auxiliary power unit.

FIG. 3 is a flowchart of an example technique for supplying cabin discharge air to an auxiliary power unit. The techniques of FIG. 3 may be described with respect to controller 24 of FIG. 1; however other controllers and/or systems may perform the techniques of FIG. 3.

Controller 24 may receive a pressure measurement for manifold 30 (200). Manifold 30 may be configured to receive cabin discharge air from cabin 12, such that the pressure measurement of manifold 30 may be related to various in-flows of cabin discharge air to manifold 30, such as from avionics 22, lavatories/galleys 20, and other parts of cabin 12 that are connected to manifold 30. The cabin discharge air includes cabin discharge air from a waste region, such as avionics 22 or lavatories/galleys 20, of cabin 12.

Controller 24 may receive a pressure setpoint for the manifold (210). The pressure setpoint may represent a predetermined flow of cabin discharge air from the cabin to the manifold. For example, the predetermined flow may include flows of cabin discharge air from waste regions, such as avionics 22 or lavatories/galleys 20, and non-waste regions of cabin 12. Manifold 30 is fluidically coupled to an auxiliary power unit (APU) configured to draw cabin discharge air from the manifold.

Controller 24 may determine, based on the pressure measurement and the pressure setpoint, a control signal for at least one manifold inlet (220). For examples, controller 24 may determine a difference between the pressure measurement and the pressure setpoint and determine a corresponding corrective signal based on that difference. The at least one manifold inlet is configured to control flow of cabin discharge air from the cabin to the manifold. For example, the at least one manifold inlet may include a control valve configured to increase or decrease from a respective waste or non-waste region of cabin 12. In some examples, the at least one manifold inlet includes a cabin inlet valve configured to control flow of cabin discharge air from a non-waste region of the cabin to the manifold. For example, flow of cabin discharge air from waste regions of cabin 12 may be prioritized to be extracted at a constant rate, such that flow from non-waste regions may be increased or decreased at variable rates.

Controller 24 may output the control signal to the at least one manifold inlet (230). For example, controller 24 may output the control signal to an actuator of the at least one manifold inlet, such that the at least one manifold inlet increases or decreases a flow of cabin discharge air through the at least one manifold inlet and, correspondingly, reduces a difference between the pressure measurement and the pressure setpoint.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

The following numbered examples demonstrate one or more aspects of the disclosure.

Example 1: A system includes a manifold, a power unit, and a throttle valve. The manifold is configured to receive cabin discharge air from a pressurized cabin, in which the cabin discharge air includes cabin discharge air from a waste region of the cabin. The power unit is fluidically coupled to the manifold and configured to draw cabin discharge air from the manifold. The throttle valve is configured to control flow of cabin discharge air from the manifold to the power unit.

Example 2: The system of Example 1, in which the pressurized cabin is an aircraft cabin, the power unit is an auxiliary power unit (APU), and the throttle valve is an APU throttle valve.

Example 3: The system of Examples 1-2 or any combination thereof, in which the waste region of the cabin includes at least one of a lavatory, a galley, and an avionics ventilation system.

Example 4: The system of Examples 1-2, in which the cabin further includes at least one outflow valve configured to control flow of cabin discharge air from the cabin to an environment.

Example 5: The system of Example 4, in which the manifold further includes at least one cabin inlet configured to receive air from a non-waste region of the cabin.

Example 6: The system of example 5, in which the at least one outflow valve includes a fore outflow valve at a front of the cabin and an aft outflow valve at a back of the cabin, and in which the at least one cabin inlet includes a fore cabin inlet valve at a front of the cabin and an aft cabin inlet valve at a back of the cabin.

Example 7: The system of Example 5, in which the at least one cabin inlet includes a fan configured to draw cabin discharge air from the manifold.

Example 8: The system of Example 7, in which the at least one cabin inlet is further configured to discharge the cabin discharge air from the manifold in close proximity to the at least one outflow valve.

Example 9. The system of Examples 5-8 or any combination thereof, further including an avionics isolation valve, an avionics outflow valve, and a fan. The avionics isolation valve is configured to isolate an avionics ventilation system from the manifold. The avionics outflow valve is configured to control flow of air from the avionics ventilation system to the environment. The fan is configured to discharge the air from the avionics ventilation system to the avionics outflow valve.

Example 10: The system of Example 9, in which the avionics outflow valve includes a large flapper configured to open when the cabin is not pressurized and a small flapper configured to open when the cabin is pressurized.

Example 11: The system of Examples 5-10 or any combination thereof, further including a controller configured to control a pressure of the cabin using at least one of the throttle valve and the at least one outflow valve, and control a flow of air to the power unit using at least one of the throttle valve and the at least one cabin inlet.

Example 12: The system of Example 6, further including a controller configured to control a balance of air extraction between the front of the cabin and the back of the cabin using at least one of the fore outflow valve, the aft outflow valve, the fore cabin inlet valve, or the aft cabin inlet valve.

Example 13: A method including receiving a pressure measurement for a manifold, in which the manifold is configured to receive cabin discharge air from a cabin, and in which the cabin discharge air includes cabin discharge air from a waste region of the cabin. The method further includes receiving a pressure setpoint for the manifold representing a predetermined flow of cabin discharge air from the cabin to the manifold, in which the manifold is fluidically coupled to a power unit configured to draw cabin discharge air from the manifold. The method further includes determining, based on the pressure measurement and the pressure setpoint, a control signal for at least one manifold inlet, in which the at least one manifold inlet is configured to control flow of cabin discharge air from the cabin to the manifold, and outputting the control signal to the at least one manifold inlet.

Example 15: The method of Example 14, in which the at least one manifold inlet includes at least one cabin inlet configured to receive air from a non-waste region of the cabin.

Example 16. The method of Example 15, in which the cabin further includes at least one outflow valve configured to control flow of cabin discharge air from the cabin to an environment, and in which the method further includes shutting the throttle valve and operating a fan to draw cabin discharge air from the manifold and discharge the cabin discharge air from the manifold in close proximity to the at least one outflow valve.

Example 17. The method of Example 16, in which the at least one outflow valve includes a fore outflow valve at a front of the cabin and an aft outflow valve at a back of the cabin, the at least one cabin inlet includes a fore cabin inlet valve at a front of the cabin and an aft cabin inlet valve at a back of the cabin, and in which the method further includes receiving a front pressure measurement corresponding to a flow of air from the front of the cabin, receiving a back pressure measurement corresponding to a flow of air from the back of the cabin, and operating at least one of the fore outflow valve, the aft outflow valve, the fore cabin inlet valve, or the aft cabin inlet valve to maintain the flow of air from the front of the cabin and the flow of air from the back of the cabin at a predetermined relationship.

Example 18. A controller is configured to receive a pressure measurement for a manifold, in which the manifold is configured to receive cabin discharge air from a cabin, and in which the cabin discharge air includes cabin discharge air from a waste region of the cabin. The controller is further configured to receive a pressure setpoint for the manifold representing a predetermined flow of cabin discharge air from the cabin to the manifold, in which the manifold is fluidically coupled to a power unit configured to draw cabin discharge air from the manifold. The controller is further configured to determine, based on the pressure measurement and the pressure setpoint, a control signal for at least one manifold inlet, in which the at least one manifold inlet is configured to control flow of cabin discharge air from the cabin to the manifold, and output the control signal to the at least one manifold inlet.

Example 19: The controller of Example 18, in which the at least one manifold inlet includes a cabin inlet valve configured to control flow of cabin discharge air from a non-waste region of the cabin to the manifold.

Example 20. The controller of Examples 18-19 or any combination thereof, in which the cabin further includes at least one outflow valve configured to control flow of cabin discharge air from the cabin to an environment, and in which the controller is further configured to shut the throttle valve and operate a fan to draw cabin discharge air from the manifold and discharge the cabin discharge air from the manifold in close proximity to the at least one outflow valve.

Various examples have been described. These and other examples are within the scope of the following claims.

What is claimed is:

1. A system, comprising:
a manifold configured to receive cabin discharge air from a pressurized cabin, wherein the cabin discharge air includes cabin discharge air from a waste region of the cabin;
at least one cabin inlet fluidically coupled to the manifold and configured to receive air from a non-waste region of the cabin, wherein the at least one cabin inlet comprises a fore cabin inlet at a front of the cabin and an aft cabin inlet at a back of the cabin;
at least one outflow valve configured to control flow of cabin discharge air from the cabin to an environment, wherein the at least one outflow valve includes fore outflow valve at the front of the cabin and an aft outflow valve at the back of the cabin;
a power unit fluidically coupled to the manifold and configured to draw cabin discharge air from the manifold;
a throttle valve configured to control flow of cabin discharge air from the manifold to the power unit; and
a controller configured to control a balance of air extraction between the front of the cabin and the back of the cabin using at least one of the fore cabin inlet, the aft cabin inlet, the fore outflow valve, or the aft outflow valve.

2. The system of claim 1,
wherein the pressurized cabin is an aircraft cabin,
wherein the power unit is an auxiliary power unit (APU), and
wherein the throttle valve is an APU throttle valve.

3. The system of claim 2, wherein the waste region of the cabin comprises at least one of a lavatory, a galley, and an avionics ventilation system.

4. The system of claim 1, wherein the at least one cabin inlet comprises a fan configured to draw cabin discharge air from the manifold.

5. The system of claim 4, wherein the at least one cabin inlet is further configured to discharge the cabin discharge air from the manifold to the at least one outflow valve.

6. The system of claim 1, further comprising:
an avionics isolation valve configured to isolate an avionics ventilation system from the manifold;
an avionics outflow valve configured to control flow of air from the avionics ventilation system to the environment; and
a fan configured to discharge the air from the avionics ventilation system to the avionics outflow valve.

7. The system of claim 6, wherein the avionics outflow valve comprises:
a first flapper configured to open when the cabin is not pressurized; and
a second flapper configured to open when the cabin is pressurized.

8. The system of claim 1, wherein the controller includes control circuitry configured to:
control, by the control circuitry, a pressure of the cabin using at least one of the throttle valve and the at least one outflow valve; and
control, by the control circuitry, a flow of air to the power unit using at least one of the throttle valve and the at least one cabin inlet.

9. A controller comprising control circuitry, wherein the controller is configured to:
receive, by the control circuitry, at least one pressure measurement for a manifold, wherein the manifold is configured to receive cabin discharge air from a cabin, wherein the cabin discharge air includes cabin discharge air from a waste region of the cabin, and wherein the at least one pressure measurement comprises:
a front pressure measurement corresponding to a flow of air from a front of the cabin;
a back pressure measurement corresponding to a flow of air from a back of the cabin;
receive, by the control circuitry, a pressure setpoint for the manifold representing a predetermined flow of cabin discharge air from the cabin to the manifold, wherein the manifold is fluidically coupled to a power unit configured to draw cabin discharge air from the manifold;
operate at least one manifold inlet to control flow of cabin discharge air from the cabin to the manifold by:
determining, by the control circuitry and based on the pressure measurement and the pressure setpoint, a control signal for the at least one manifold inlet, wherein the at least one manifold inlet comprises at least one cabin inlet fluidically coupled to the manifold and configured to receive air from a non-waste region of the cabin, wherein the at least one cabin inlet comprises a fore cabin inlet at a front of the cabin and an aft cabin inlet at a back of the cabin; and
outputting, by the control circuitry, the control signal to the at least one manifold inlet; and
operate at least one of a fore outflow valve, an aft outflow valve, the fore cabin inlet valve, or the aft cabin inlet valve to maintain the flow of air from the front of the cabin and the flow of air from the back of the cabin at a predetermined relationship, wherein the fore outflow valve is configured to control flow of cabin discharge air from the front of the cabin to an environment, and wherein the aft outflow valve is configured to control flow of cabin discharge air from the back of the cabin to the environment.

10. The controller of claim 9, wherein the waste region of the cabin comprises at least one of a lavatory, a galley, and an avionics ventilation system.

11. The controller of claim 9, wherein the at least one cabin inlet valve is configured to control flow of cabin discharge air from a non-waste region of the cabin to the manifold.

12. The controller of claim 9, wherein the controller is further configured to:
shut a throttle valve configured to control flow of cabin discharge air from the manifold to the power unit; and
operate a fan to draw cabin discharge air from the manifold and discharge the cabin discharge air from the manifold to the at least one outflow valve.

13. A system, comprising:
a manifold configured to receive cabin discharge air from a pressurized cabin, wherein the cabin discharge air includes cabin discharge air from a waste region of the cabin;
at least one cabin inlet fluidically coupled to the manifold and configured to receive air from a non-waste region of the cabin, wherein the at least one cabin inlet comprises a fore cabin inlet at a front of the cabin and an aft cabin inlet at a back of the cabin;
at least one outflow valve configured to control flow of cabin discharge air from the cabin to an environment, wherein the at least one outflow valve includes fore outflow valve at the front of the cabin and an aft outflow valve at the back of the cabin;
a power unit fluidically coupled to the manifold and configured to draw cabin discharge air from the manifold;
a throttle valve configured to control flow of cabin discharge air from the manifold to the power unit;
an avionics isolation valve configured to isolate an avionics ventilation system from the manifold;
an avionics outflow valve configured to control flow of air from the avionics ventilation system to the environment, wherein the avionics outflow valve comprises:
a first flapper configured to open when the cabin is not pressurized; and
a second flapper configured to open when the cabin is pressurized; and
a fan configured to discharge the air from the avionics ventilation system to the avionics outflow valve.

* * * * *